US008738650B2

(12) United States Patent
Bawa et al.

(10) Patent No.: US 8,738,650 B2
(45) Date of Patent: *May 27, 2014

(54) DISTRIBUTED PROCESSING OF STREAMING DATA RECORDS

(71) Applicants: Jaskaran Singh Bawa, Faridabad Haryana (IN); Bijay Singh Bisht, New Delhi (IN); Anand Vivek Srivastava, Kanpur (IN); Sumanta Kumar Bhowmik, New Delhi (IN); Atul Kumar Saraf, Noida (IN)

(72) Inventors: Jaskaran Singh Bawa, Faridabad Haryana (IN); Bijay Singh Bisht, New Delhi (IN); Anand Vivek Srivastava, Kanpur (IN); Sumanta Kumar Bhowmik, New Delhi (IN); Atul Kumar Saraf, Noida (IN)

(73) Assignee: Guavus, Inc., San Mateo ( * ) Notice: Subject to any disclaimer, the term of this patent is extended or adjusted under 35 U.S.C. 154(b) by 0 days.

This patent is subject to a terminal disclaimer.

(21) Appl. No.: 13/901,291

(22) Filed: May 23, 2013

(65) Prior Publication Data

US 2013/0318034 A1    Nov. 28, 2013

Related U.S. Application Data

(63) Continuation of application No. 13/836,757, filed on Mar. 15, 2013.

(60) Provisional application No. 61/650,016, filed on May 22, 2012.

(51) Int. Cl.
*G06F 17/30* (2006.01)

(52) U.S. Cl.
USPC ........................................................ 707/770

(58) Field of Classification Search
USPC ................................................. 707/603, 770
See application file for complete search history.

(56) References Cited

U.S. PATENT DOCUMENTS

| 6,662,195 | B1 | 12/2003 | Langseth et al. |
| 6,741,980 | B1 | 5/2004 | Langseth et al. |
| 7,792,784 | B2 | 9/2010 | Gupta |
| 7,870,279 | B2 | 1/2011 | Chuang et al. |

(Continued)

FOREIGN PATENT DOCUMENTS

| EP | 2400404 A1 | 12/2011 |
| EP | 2400404 A1 | 12/2011 |
| WO | 2009012235 A1 | 1/2009 |
| WO | WO-2009012235 A1 | 1/2009 |

OTHER PUBLICATIONS

International Search Report issed on Oct. 28, 2013 for International Patent App. No. PCT/IB2013/001521.

(Continued)

*Primary Examiner* — Amresh Singh
(74) *Attorney, Agent, or Firm* — Bingham McCutchen LLP

(57) ABSTRACT

Representative embodiments of a distributed processing method of facilitating interactive analytics of streaming data records by receiving the data records at a plurality of distributed computational nodes, establishing and storing dimensions corresponding to attributes of the data records, parsing the streaming data records to identify matches to at least one of the dimensions and based thereon, reducing the number of data records to create a targeted subset of the data, re-distributing the targeted subsets of the streaming data records among the distributed computational nodes in accordance with the dimensions stored on the nodes, updating a database storing measures of the dimensions in accordance with the targeted subsets of the streaming data records, and using the database to respond to a query based on measures associated with one or more of the dimensions.

13 Claims, 7 Drawing Sheets

(56) References Cited

U.S. PATENT DOCUMENTS

| | | | |
|---|---|---|---|
| 7,949,730 | B2 | 5/2011 | Rensin et al. |
| 8,255,454 | B2 | 8/2012 | Broda |
| 2003/0061225 | A1* | 3/2003 | Bowman et al. .............. 707/100 |
| 2009/0083277 | A1* | 3/2009 | Barsness et al. ................ 707/10 |
| 2010/0280857 | A1 | 11/2010 | Liu et al. |
| 2012/0016835 | A1* | 1/2012 | Singh et al. ................... 707/603 |
| 2012/0215612 | A1 | 8/2012 | Ramer et al. |

OTHER PUBLICATIONS

Written Opinion issued on Oct. 28, 2013 for International Patent App. No. PCT/IB2013/001521.

Chen et al, "Multi-dimensional regression analysis of time-series data streams", University of Illinois at Urbana-Champaign, U.S.A., Proceedings of the 28th VLDB Conf. China, (2002).

Mo Liu et al, E:Cube: Multi-dimensional event sequence processing using concept and pattern hierarchies, IEEE 26th International Conf. on Data Engineering, Long Beach, CA, (2010).

* cited by examiner

DISTRIBUTED PROCESSING OF STREAMING DATA RECORDS

CROSS-REFERENCE TO RELATED APPLICATIONS

This application is a continuation application of, and incorporates herein by reference in its entirety, U.S. patent application Ser. No. 13,836, 757, filed on Mar. 15, 2013, which claims priority to and the benefit of U.S. Provisional Patent Application No. 61/650,016, which was filed on May 22, 2012, which is hereby incorporated herein by reference in its entirety.

FIELD OF THE INVENTION

In various embodiments, the present invention relates to data analytics, and in particular to distributed processing of streaming data records using a plurality of computational nodes.

BACKGROUND

Interactive analytics refers to the real-time manipulation of data to thereby answer ad-hoc queries concerning that data. Because it is interactive, it has a requirement for low-latency (e.g., sub-second) response time for the queries. For example, a wireless telecommunication provider may offer voice and data services via a cellular network; the provider may wish to analyze, in real-time, the effects of new services, operations, or products on the network. For example, if a new type of mobile handset is available, the provider may want to know (i) how much data traffic in a particular area was generated by the devices in the past hour (or other amount of time) or (ii) how much data traffic in the area was generated by a particular application running on the devices in the past hour. The answers to these queries must be available very quickly to be useful.

To be most useful, the allowable queries need to be highly flexible. For example, the size of the queried areas may vary from towns to cities, states, and regions; the devices queried may vary from particular makes or models to product lines, and the data transmitted to or from the devices may vary from all data or only data sent by a particular application or application type.

In many situations the data is not in a convenient format to answer these queries quickly or efficiently. The raw data may be, for example, low-level, high-volume, and streaming in nature. Low-level data, as the term is used herein, means that the data is not organized into high-level categories such as "the amount of data traffic in the Washington, D.C. area in the past hour", but rather is made available in highly disaggregated form. The disaggregated form could be, for example, a collection of data records each having a record number and a flat list of items of data (e.g., user ID, device ID, application ID, data bytes transferred, and/or region ID). Each record may correspond to, for example, a single transfer of some number of bytes of data traffic to a particular application (e.g., a web browser) running on a particular device (as identified by its device ID) operated by a particular user at a specific moment in time. Note that the device type may not be given directly, but instead may be derived from the device ID. Furthermore, the records may be physically distributed (i.e., records for different regions may be generated in different locations).

The data is also high-volume: a large network operator may have hundreds of millions of customers, for example, many of whom are using their devices at any given time, so that the aggregate number of records being generated is very large. A few billion records may be generated per hour, for example. Finally, the data is streaming in nature. That is, it is generated more-or-less continuously in time.

One challenge in managing and analyzing such data is to provide an analyst (or other submitter of a query) with the ability to answer a wide range of flexible queries with answers based on low-level, high-volume, streaming records with sub-second response time. The manipulation of data to answer these queries may be solved using a data model called online analytical processing ("OLAP") cubes. Conceptually, data in an OLAP cube is organized into a set of independent dimensions; the cube may have any number of dimensions. In the foregoing example, the dimensions could be device-type, region, and application, because the example queries concern devices, regions, and applications. The items stored in the cube are referred to as measures. In the present case, the measure is number of bytes transferred in the past hour ("data traffic"). Finally, specific instances of a dimension are referred to as labels. In the example, the labels might include "IPHONE 4" (for the device-type dimension) and "Washington, D.C." (for the region dimension).

FIG. 1 shows an illustration of this data layout in an OLAP cube 100. The cube has a first dimension "device-type," a second dimension "application," and a third dimension "region." To answer a query, the cube returns a sum of the measures in the cells corresponding to the intersection of the appropriate layers of the cube. For example, to determine the number of bytes transferred in the past hour by web browsers running on IPHONE 4s in the Washington, D.C. area, the system retrieves a single cell 102 that lies at the intersection of the "Washington, D.C." slice 104 of the region dimension, the "IPHONE 4" slice 106 of the device-type dimension, and the "web browser" slice 108 of the application dimension. Such operations may be done with sub-second response time. In practice, however, such data is not usually stored in a cube organization, but rather in a database that is suited for storing and performing queries on data with this logical structure; OLAP cubes may satisfy the need for sub-second response time for a flexible set of ad hoc queries, the data organization typically handled by such systems is not low-level, high-volume, streaming data.

Another technology relevant to interactive data analytics on large streaming data sets is cluster computing. A compute cluster is a set of general-purpose computing systems (i.e., nodes) having a directly attached local storage (e.g., a hard disk) connected by a local area network (e.g., a single, high speed switch). Using such clusters it is possible to process large amounts of data in relatively short time intervals. The basic principle of cluster computing is divide and conquer. To process a large data file, the file is divided up and a portion is placed on the local storage of each compute node. Each node then processes its local data, optionally communicating with one or more of the other compute nodes. While cluster computing has the potential to process large amounts of data, however, cluster computing is not well suited to processing streaming data. Cluster computing assumes that data is resident on local storage and does not provide any particular advantage when data is not on local storage, but rather is made available incrementally over time (streaming).

Thus, a need exists for a way to query, in real-time, large, constantly changing, low-level data sets.

SUMMARY

In one embodiment, a system and method of cluster computing receives reorganizes streaming data at individual nodes to produce a data layout, such as cube or set of cubes, once per time period. The time lag between when input data is first available and when output data may be observed or manipulated by analysts is low (typically a small multiple of the basic time period of the system, e.g., five minutes or one hour). This system and method contrasts to a traditional report-oriented data-warehouse system in which reports are generated much less frequently (e.g., once per week or month). Embodiments of the present invention also have a number of advantages when compared to stream-processing systems including increased data integrity, the ability to support queries outside the predefined set, and the ability to correct or repair system outputs.

Accordingly, in one aspect, a distributed method of processing streaming data records includes receiving the streaming data records at a plurality of distributed computational nodes, each node comprising a processor and a storage element; and establishing and storing, at each node, dimensions corresponding to attributes of the data records. The streaming data records are parsed at each node to (i) identify matches to at least one of the dimensions and (ii) based thereon, reduce the number of data records to create a targeted subset of the data. The targeted subsets of the streaming data records are re-distributed among the distributed computational nodes in accordance with the dimensions stored on the nodes. A database storing measures of the dimensions is updated in accordance with the targeted subsets of the streaming data records. The database is used to respond to a query based on measures associated with one or more of the dimensions.

A pull request may be sent for the streaming data records or a push notification may be received associated with the data records. A received data record may be labeled with a time-period. The streaming data records may be distributed to the plurality of distributed computational nodes based on content within the streaming data records or randomly. Key-value pairs may be created by parsing the streaming data records, which may be sorted and combined. The re-distributing of the targeted subsets of the streaming data records may include sending key-value pairs having the same key to one of the plurality of distributed computational nodes. The database may include an OLAP cube or a plurality of redundant OLAP cubes. A cell in the OLAP cube may include comprise information derived from the streaming data records. A request for information may be received from the database.

In another aspect, a system for distributed processing of streaming data records includes a plurality of computing nodes; each node includes a processor and a local storage device and receives a portion of an input stream of data records, parses the portion, and selectively redistributes some or all of the portion to another node in the plurality of computing nodes in accordance with content therein. A network connects the plurality of computing nodes; the network distributes and re-distributes the data records amongst the plurality of computing nodes. A database stores an OLAP cube having data based on the parsed and re-distributed data records. A user interface may be included for sending a query to, and receiving a response from, the database. The plurality of computing nodes may comprise a Hadoop cluster.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
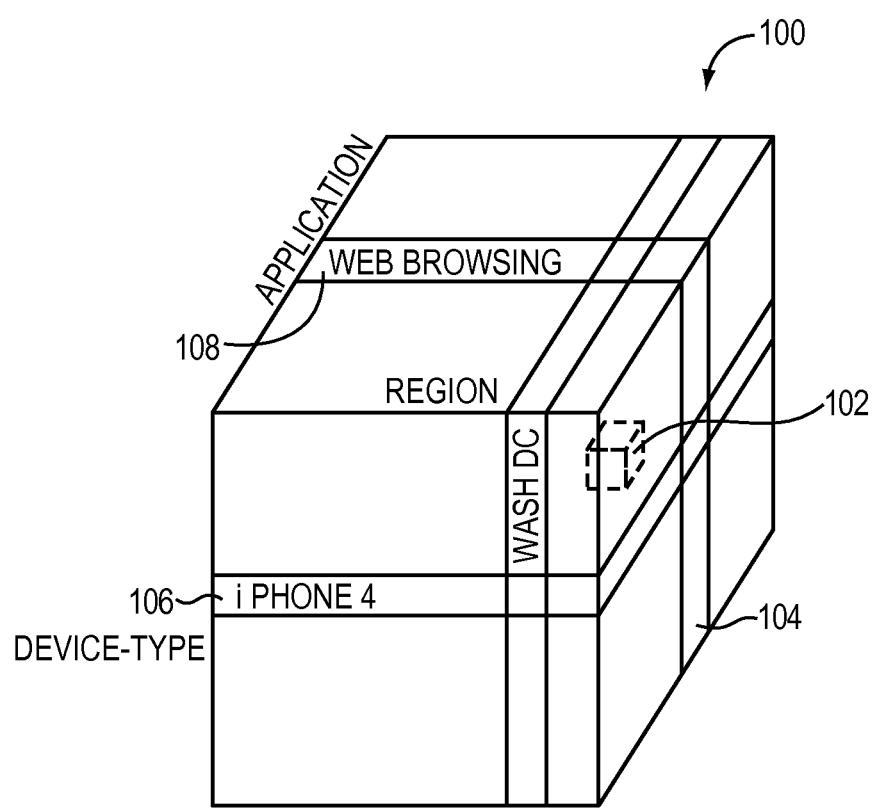
FIG. 1 depicts an example of an OLAP cube data model.
Figure 2A:
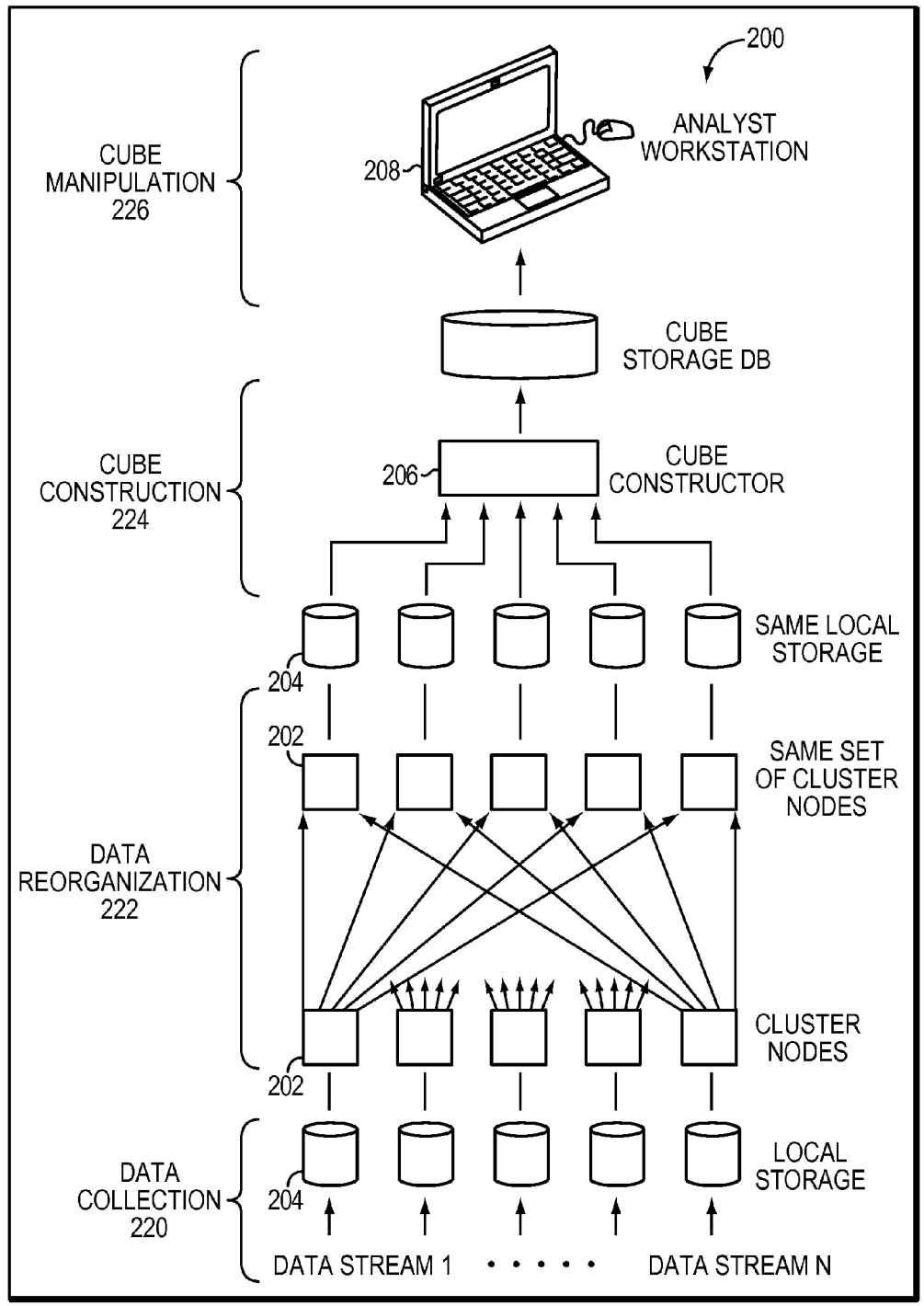
FIG. 2A depicts a data flow diagram for distributed processing of streaming data records in accordance with an embodiment of the invention.

A representative embodiment of a process flow 200 for the distributed processing of streaming data records FIG. 2A. In a first, data-collection stage 220, a system including a plurality of storage elements 204 receives an incoming stream of data via, for example, a network link. The received data is transferred from the storage elements 204 to a plurality of cluster nodes 202 in a second, data-reorganization stage 222. In this stage, the cluster nodes 202 may reorganize and redistribute the data amongst themselves after analyzing the data, as described in greater detail below, and write the data back to the storage elements 204. A third, cube-construction stage 224 includes a cube constructor 206 that receives the received and reorganized data and constructs an OLAP cube, as described in more detail below, and stores the cube in a cube-storage database 210. In a cube-manipulation stage 226, a user of a workstation 208 (or other client device) may query the constructed cube to access data and/or reconfigure the cube.

In general, a "node" as used herein means a distributed computer in, for example, a HADOOP cluster; and in a typical implementation there is only one cube (though it may be broken up across data stores/machines). Systems including more than one cube are, however, within the scope of the current invention. A representative implementation of the present invention is capable of producing a cube or set of related cubes once per time period; a typical time period could be five minutes or one hour. The system may be organized as a pipeline, the entirety of which executes once per time period. In a representative embodiment, there are four stages in the pipeline.

Figure 2B:
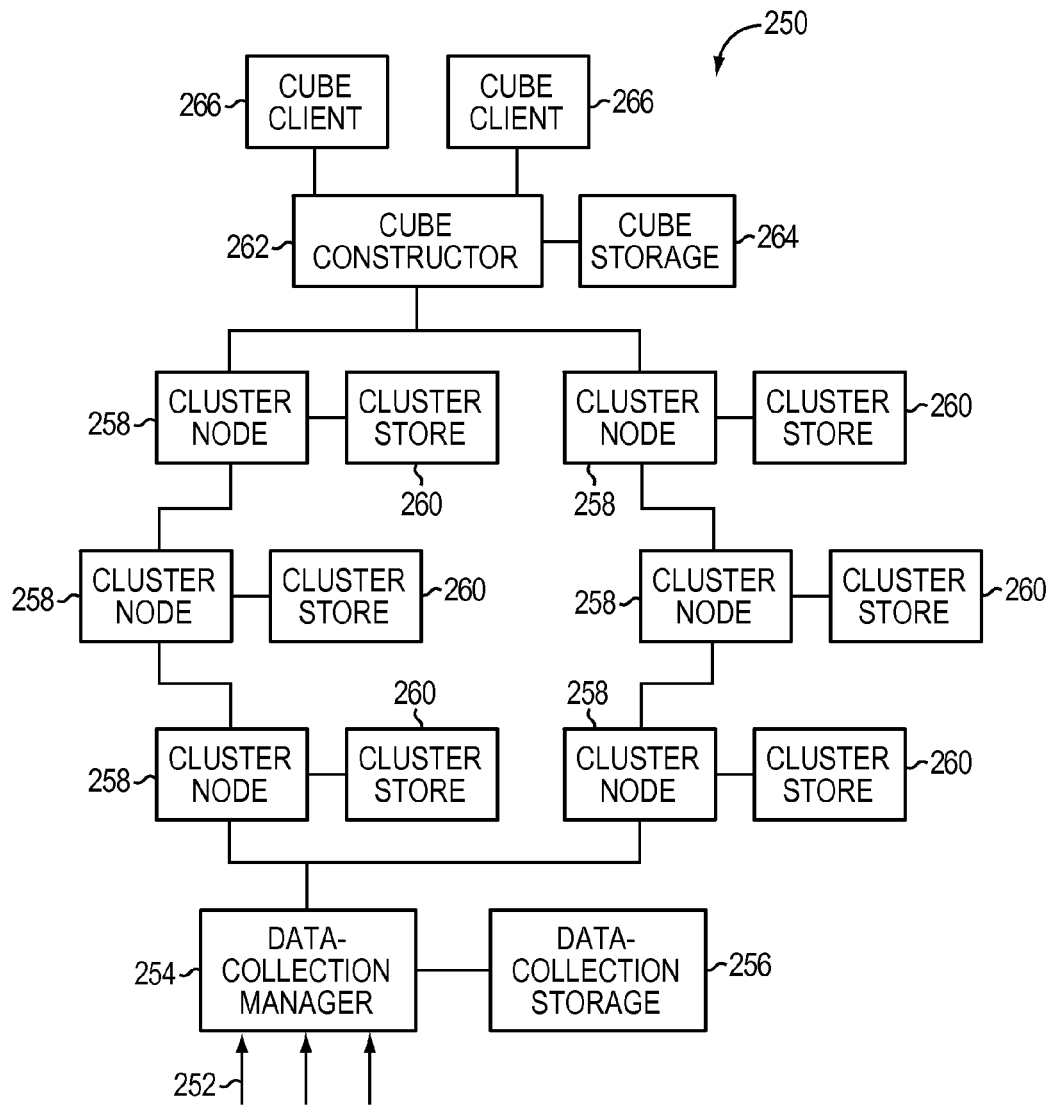
FIG. 2B depicts an exemplary system for distributed processing of streaming data records in accordance with an embodiment of the invention.

An exemplary embodiment of a system 250 for the distributed processing of streaming data records appears in FIG. 2B. One or more input data streams 252 are received by a data-collection manager 254, which may be any system or group of systems designed for the receipt and manipulation of large amounts of streaming data. In one embodiment, the data-collection manager 254 includes one or more high-capacity network input ports, routers and/or switches. The data-collection manager 254 may further include an operating system running on a processor, memory, and storage 256 for sorting / modifying the incoming data 252 (i.e., applying a timestamp to the incoming data). The data-collection manager 254 sends the received data (at periodic intervals or continuously) to cluster stores 260 in a cluster. The cluster stores 260 may be distributed amongst the cluster nodes 258 (as shown), distributed in their own cluster (separate from the cluster stores 258), or any combination thereof. The data-collection manager 254 may distribute the incoming data across the cluster stores 260 randomly, in accordance with the workloads of the cluster nodes 258 and/or cluster stores 260, in accordance with properties of the data 252, or in any other fashion.

The cluster nodes 258 process the data 252 and may re-distribute it across the cluster stores 260 in accordance with properties determined about the data (for example, the cluster nodes 258 may group similar data together in a subset of the cluster stores 260). Each cluster node 258 may include one or more processors, memory, local storage, an operating system, a network interface, or, as one of skill in the art will understand, any other component required for the cluster-based processing of data. The data, as processed/organized by the cluster nodes 258, is received by a cube constructor 262, which constructs an OLAP cube based on the data or subset thereof. The cube may be stored in a cube-storage database 264, which may include storage devices, processing devices, network interfaces, and/or similar components. In one embodiment, the cube-storage database 264 includes a traditional database-management system (e.g., a SQL-based database) having a software layer on top to store OLAP cube structures. One or more cube clients 266 may then access the information in the OLAP cube and/or issue commands to the cube constructor 262 to modify the data in the cube.

Figure 3:
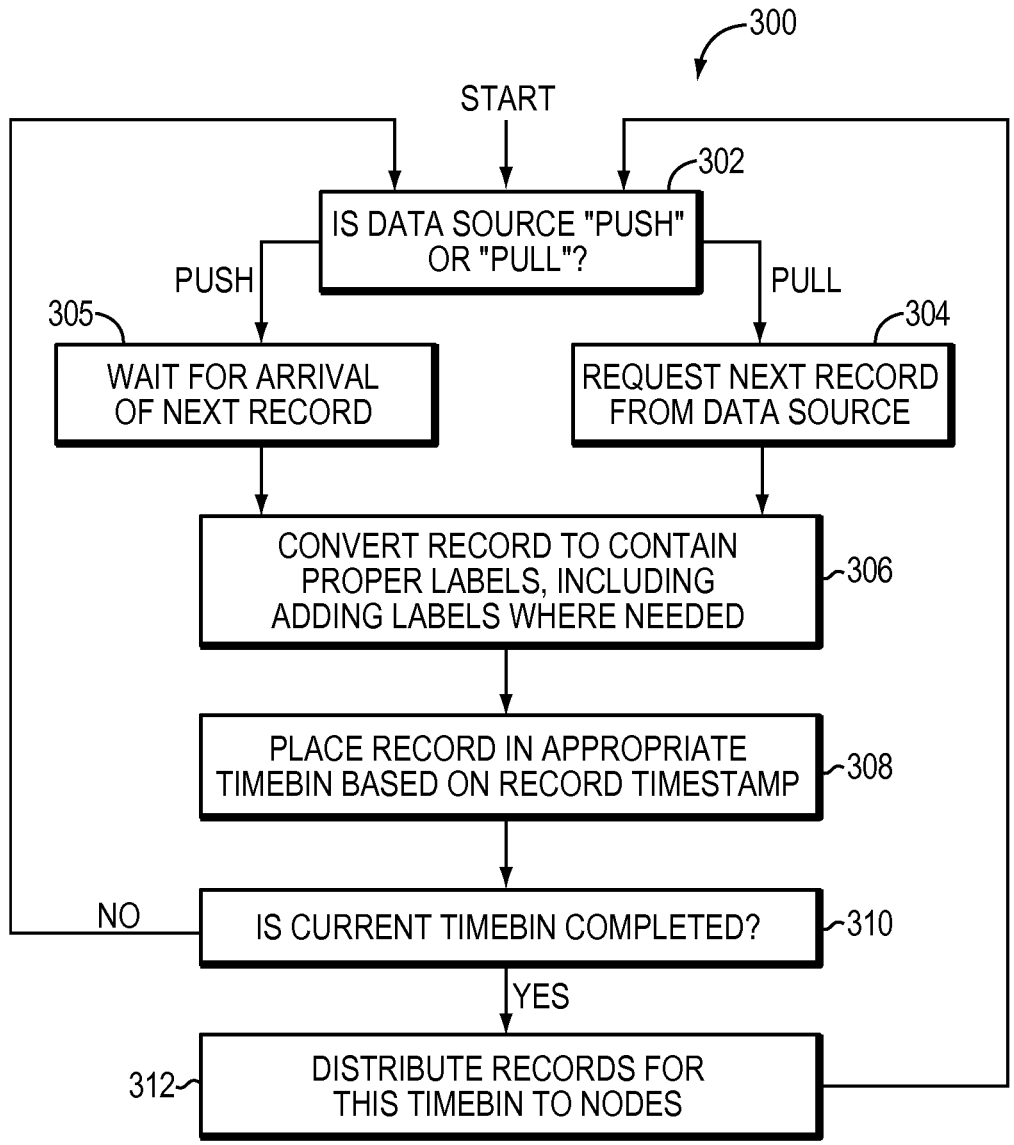
FIG. 3 is a flow chart illustrating a method of data collection in accordance with various embodiments of the invention.

One embodiment of the data-collection stage 220, as performed by (e.g.) the data-collection manager 254, is shown in greater detail in the flowchart 300 in FIG. 3, which illustrates a method for managing one or more streams of data arriving at the system 250 and assimilating the data therein. The data may arrive via a variety of methods or protocols, such as push or pull data; the data-collection manager 254 may, in a first step 302, determine the type of data-transmission protocol. If the data is pull data, the data-collection manager 304 may, in a second step 304, request the next data record(s) from a data source. The data source may be, for example, cell-phone data records provided by a cellular provider or any other type of similar real-time streaming data. If the data is push data, the data-collection manager 254 may wait, in an alternative second step 306, for the arrival of the next data record. As used herein, the term "data record" refers to a group of related data, such as the information related to a cellular-phone call, that is packaged as a unit. The present invention is not, however, limited to any particular type, format, or grouping of the incoming data stream. For example, the incoming data may include a continuous stream of homogenous data instead of, or in addition to, data records.

Once a new data record arrives, the data-collection manager 254 may re-format the data for downstream processing in a third step 306. This re-formatting may include the addition of a new data label to a data record based on a received data label in the data record. For example, the downstream OLAP cube requires a "device-type" label, but a received data record may include only a "device ID" label. The data-collection manager 254 may therefore determine the device-type based on the device ID and add the device-type to the data record. In one embodiment, the device ID, if it is not otherwise required by the OLAP cube, is deleted from the data record. In other embodiments, the data-collection manager 254 removes other, or all, un-needed data labels from the data record.

In one embodiment, time is divided into a plurality of time periods (or timebins), and each incoming data record is assigned to a timebin. Each time period may be, for example, one minute, five minutes, 30 minutes, one hour, or any other segment of time. In a fourth step 308, data records received during a given time period may be labeled accordingly with, for example, the time, the timebin number, or any other similar identifying label. In one embodiment, the data records are placed into a bin corresponding to their time period.

The data-collection manager 254 continues to process incoming data records, periodically checking to see if the current time period has expired in a fifth step 310. If so, the received data records for the current time period are distributed to the cluster nodes 258, 260 in a sixth step 312. Each record is sent to one local store in the system, or optionally a small number of local stores for fault-tolerance.

Figure 4:
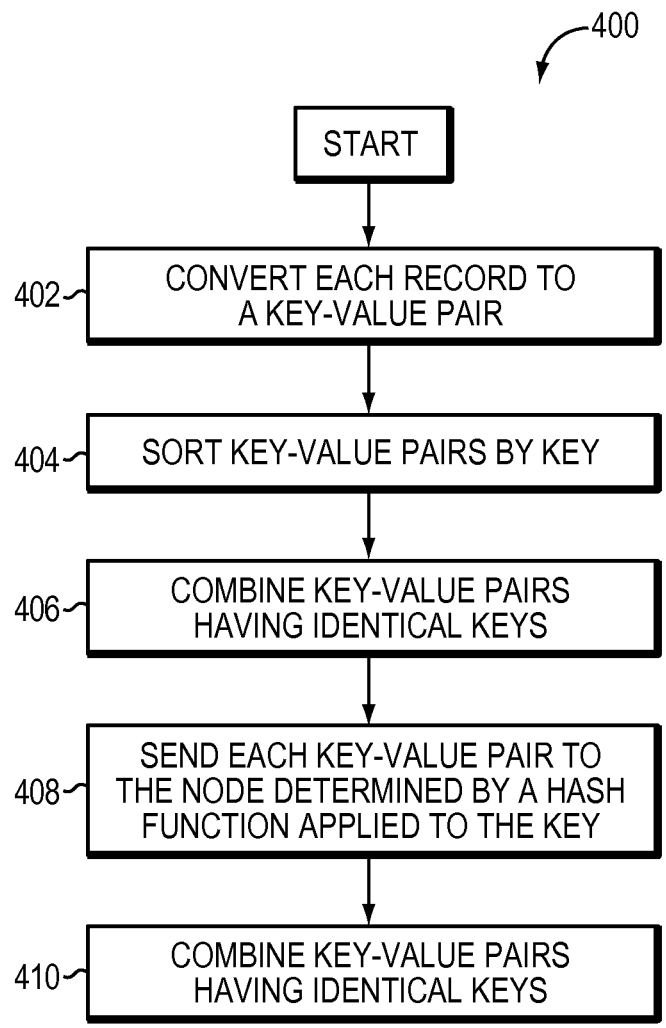
FIG. 4 is a flow chart illustrating a method of data reorganization in accordance with various embodiments of the invention.

Once the data arrives at the nodes 258, 260, it is re-organized in accordance with one embodiment of the invention shown in FIG. 4. Each node 258 works on the set of records in its local store 260. In one embodiment, in a first step 402, each record is converted into a key-value pair. The value in the key-value pair may be the measure associated with the data record; the key may be determined by the dimensions of the cube. In one embodiment, the key used in the key-value pair is the concatenation of the OLAP labels that are to be used to identify the value. Thus the definition of the OLAP cube directly determines the representation used for the key-value pair. The set of all key-value pairs (one per input data record) is referred to as the input key-value set.

In a second step 404, the key-value pairs may be sorted by their keys, and, in a third step 406, the key-value pairs having identical keys are combined. Any method of combining identical key-value pairs is, however, within the scope of the current invention, and the sorting is not required. The method of combination of the key-value pairs may vary depending on the end result desired in the OLAP cube. If, for example, a user wishes to find a total number of bytes transferred from all mobile devices under certain conditions, the values may be summed; if, as another example, a user wishes to find the maximum number of bytes transferred from any given device, a maximum function may be applied to the values. Any similar function is, however, within the scope of the present invention.

In a fourth step 408, each node 258, 260 may apply a hash function to each key. In one embodiment, the hash function has the property that, given any key, it will return the ID of one of the nodes 258, 260 in the system. Further, the hash function may be constructed such that the node ID returned is typically equally probable to be any node ID in the system. The node then sends each key-value pair to the node given by the output of the hash function. Any other method of evenly distributing the keys to the nodes 258, 260 is, however, within the scope of the present invention.

One result of the above-described shuffle-sort is that, for any key, all key-value pairs for that key are now located on the same node 258, 260. This location facilitates the fifth step 410: each node 258, 260 then sorts its new set of key-value pairs again and applies the predefined function (e.g., sum or max) to all key-value pairs with the same key. The result is that only one key-value pair exists for each key in the system. The resulting set of output key-value pairs are then stored in the node's local storage 260. The output key-value set may have the following two properties: (1) each key occurs only once in the output set, and (2) the value associated with any key in the output set is a predefined function of all the values associated with the same key in the input key-value set.

The data reorganization stage 400 thus massively reduces the volume of the input data; the size of the output key-value set may be reduced by a factor of hundreds to thousands compared to the size of the input record set. Also, it brings together all data in the input record set that corresponds to a single OLAP cube element and combines that data using the predefined function. This process creates the fundamental measure that will be stored in the OLAP cube. Furthermore, it accomplishes data reorganization in a way that can be effectively scaled up when data volume grows (by, e.g., adding more nodes 258, 260). Because data is divided evenly across the nodes 258, 260 both before and after the shuffle sort, each node may continue to operate on a fixed amount of data even when overall data volume grows.

Figure 5:
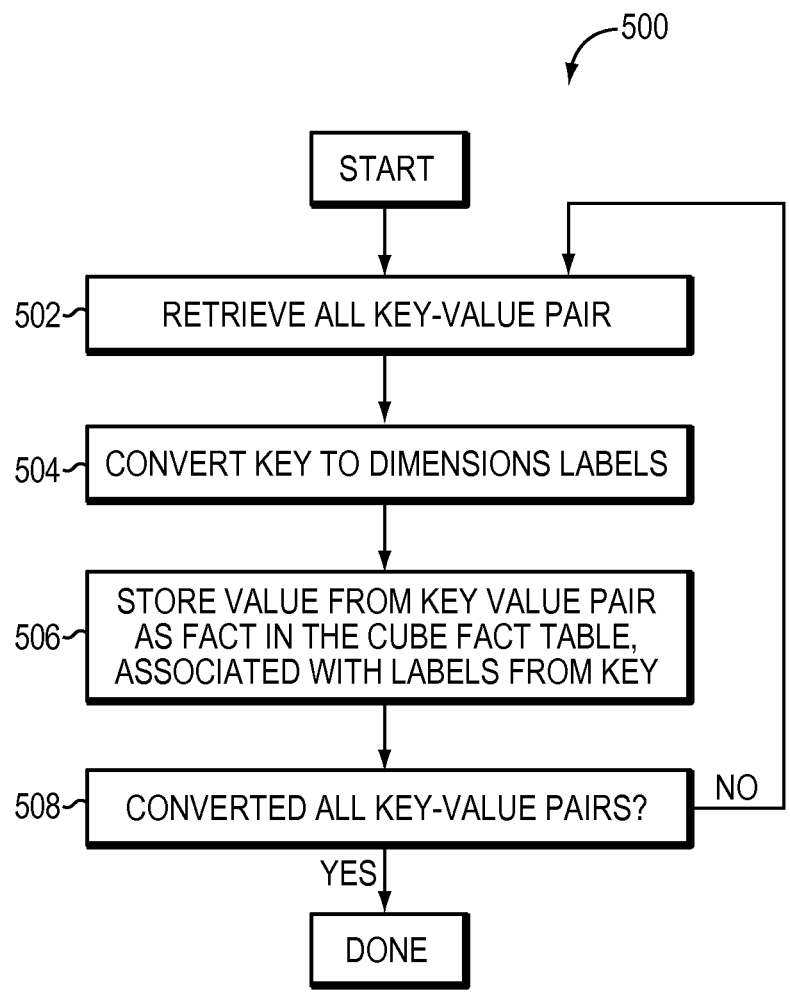
FIG. 5 is a flow chart illustrating a method of data cube construction in accordance with various embodiments of the invention.

A method 500 for cube construction is illustrated in FIG. 5. In a first step 502, the cube constructor 262 receives the key-value pairs from the various local stores 560. Each key-value pair may then become one cell in the cube, which may be stored in the cube-storage database 264 and/or in storage local to one or more clients 266.

One representation for an OLAP cube when stored in a database is called a "star schema." In a star schema, there is a table of "facts" and multiple "dimension" tables. The fact table has a single row for each nonempty cell of the OLAP cube. Each dimension table has a single row for each label used within the dimension. In a second step 504, the key in each key-value pair is converted to dimension labels; in a third step 506, the value is stored in the fact table. Thus, each key-value pair may become one cell in the cube. This process repeats, in accordance with a fourth step 508, until all key-value pairs having been converted to cells in the star schema. One advantage of the present approach is that each output key-value pair may map directly onto a single row in the fact table.

In order to meet the requirements of sub-second response time to queries, in one embodiment, the OLAP cubes generated are capable of being stored in the main memory of a workstation (or other client 266). In practice, this requirement limits the number of cells that a cube may contain (e.g., a usable cube may contain millions, but not hundreds of millions, of cells). There are ways that cube size may be kept manageable: by limiting the number of dimensions of the cube, for example, and/or by limiting the number of labels per dimension. If the number of dimensions is limited, however, the nature of the queries that an analyst can formulate may also be limited. Thus, a tradeoff may exist when designing the set of OLAP cubes (i.e, choosing what dimensions each cube will have). The cubes have dimensions that correspond to a natural or important set of analyst queries, and yet they cannot contain too many dimensions or they will violate response time requirements.

In one embodiment, redundant cubes are computed. Two cubes are redundant (or "denormalized") if they contain measures for some of the same dimensions or if the two cubes are based on some common inputs. For example, a cube with dimensions "device-type" and "region" has redundancy with a cube having dimensions "region" and "application." Although each cube supports queries that the other cube does not (e., "device-type" and "application"), both cubes may be used to answer queries that only involve the "region" dimension.

Although redundant cubes may address the problem of cube size, they may introduce another problem: additional work is required to compute a set of redundant cubes as compared to the minimal set of non-redundant cubes. In one embodiment, data reorganization computes "base cubes," i.e., a set of cubes with low redundancy. Later, the actual OLAP cubes used by the analyst are derived from the set of base cubes. It is the base cubes that are actually stored in the database management system 264, while OLAP cubes are constructed on demand in response to user actions. Hence, the work involved in computing redundant data may be shared between the data-reorganization step and the user interface. Various applications of the present invention may present different requirements and constraints (e.g., different amounts of processing power available at different stages of the system) the design of both the base cubes and the OLAP cubes may thus be varied accordingly.

The second way that cube size may be kept manageable is by limiting the number of labels (i.e., distinct instances within a dimension) in the cube. For example, in the case of the "region" dimension, regions may be defined to be metropolitan areas in the US (of which there are hundreds) or zip codes (of which there are tens of thousands). In the latter case, the size of the cube will be much larger. Limiting the number of labels per dimension imposes another tradeoff between the resolution at which queries may be expressed and the size of the OLAP cubes.

Figure 6:
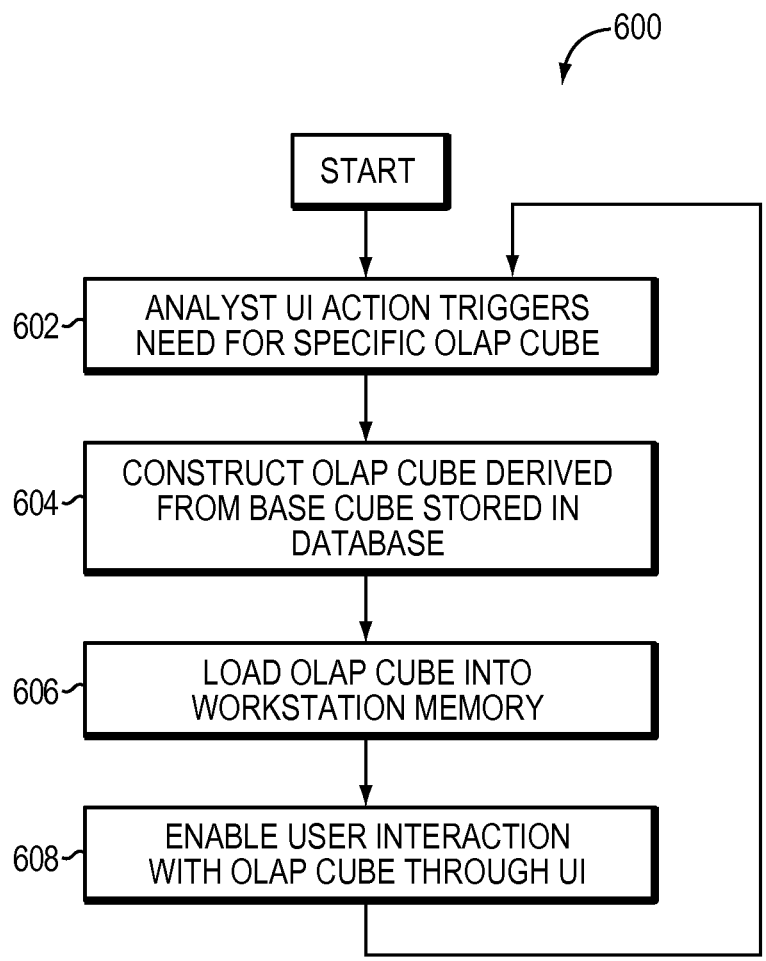
FIG. 6 is a flow chart illustrating a method of interactive data cube manipulation in accordance with various embodiments of the invention.

FIG. 6 illustrates a method 600 for loading the OLAP cube into the memory of a client 266 so that it may be manipulated with sub-second response time. In a first step 602, this loading may be performed in response to an analyst action, such as a menu selection that indicates that the analyst intends to work with the data in this particular cube. In a second step 604, as explained above, the OLAP cube that is manipulated in the client 266 may be derived, on demand, from a base cube stored in the cube database 264. The derived OLAP cube may be loaded on to the client 266 in a third step 606. The cube system 262, 264 and/ or client 266 may maintain an in-memory cache of OLAP cubes that have been recently constructed, so that if analyst actions require loading a particular OLAP cube, the process will be faster if the cube was recently constructed and happens to remain in memory. If a new type of query is requested, outside of the scope of a base cube, the base cube may be updated so that the dimensions corresponding to the new query may be combined and new data satisfying the combination is collected.

An example of the receipt of a data record and its subsequent processing will now be presented. The data record R1 includes the following label types:

R1: (timestamp, user-ID, device-ID, application-ID, data-bytes-transferred, region-ID)

At the data-collection stage 220, the device ID is transformed into a device type, and the user ID region ID are deleted (because they are not needed in the downstream cube). Once the timestamp is used to determine that the record R1 lies within the relevant time period, it too is deleted. The resultant key-value pair is:

((device-type, region-ID, application-ID), data-bytes-transferred)

Three example key-value pairs that match this format, which are sent to the data-reorganization stage 222, are:

((iphone4S, Washington-dc, web), 1000)
((iphone4S, New-York, web), 3000)
((iphone4S, Washington-dc, web), 2500)
((iphone4S, New-York, video), 10000)

The data-reorganization stage 222 first sorts the key-value pairs by key to yield:
    ((iphone4S, New-York, video), 10000)
    ((iphone4S, New-York, web), 3000)
    ((iphone4S, Washington-dc, web), 1000)
    ((iphone4S, Washington-dc, web), 2500)
And then combines key-value pairs that have identical keys (while summing the data bytes transferred) to yield:
    ((iphone4S, New-York, video), 10000)
    ((iphone4S, New-York, web), 3000)
    ((iphone4S, Washington-dc, web), 3500)
These key-value pairs are then inserted into the OLAP cube in the cube-construction stage 224.

The systems and methods described herein offer numerous advantages. As a first example, raw high-volume data is never entirely aggregated at any point in the system. Rather, such data is brought into the system in a distributed fashion so that no single node is ever required to store an entire time period's raw data. This advantage accrues from placing the collector internal to the system, so that it moves data from external sources directly onto the distributed local stores in the system.

Second, although not traditionally conceived as a stream-processing system, cluster computing is made usable for the task of periodic cube construction. This advantage follows from (a) converting streaming data to time-period-based data, (b) keeping streaming data distributed across separate nodes, and/or (c) processing via periodic scheduling of repeating jobs on the computer cluster, in which one job is scheduled during each time period.

Third, the design of the data-reorganization step may be dictated by the OLAP cube organization, meaning that the design effort for the data-reorganization step is lessened or minimized. The keys used for the key-value pairs (the central data structure in the data-reorganization step) are determined directly by the dimension labels of the OLAP cube. In fact, code for much of the data-reorganization step may be automatically generated as a result.

The time lag between when input data is first available and when output data may be observed or manipulated by analysts is low (typically a small multiple of the basic time period of the system, e.g., 5 minutes or 1 hour). This time period is in contrast to a traditional report-oriented data-warehouse system in which reports are generated once per week or month. This provides significant advantage in situations where rapid response to events is desired.

The system also has a number of advantages when compared to stream-processing systems. In a stream-processing system, queries are defined over streams, and results are delivered with relatively low latency. Advantages over stream-processing systems include, first, the fact that ensuring data integrity is simplified. Data integrity refers to the fact that no data is lost or duplicated within the system, so that system outputs correct reflect all and only the input data. To ensure data integrity, one must hold data until the operation that transforms it can be verified to be successfully completed (i.e., the transaction is "committed"). Further, transformation operations must be atomic—i.e., all-or-nothing, allowing them to repeated when they fail. Stream-processing systems, because they do not hold data until operations are committed, nor provide all-or-nothing semantics, cannot ensure data integrity. In systems according to the present invention however, atomicity and data buffering are easily added and applied throughout the system.

Another advantage over stream-processing systems derives from the ability of embodiments of the invention to support queries outside the predefined set when necessary. This capability is required for "drill-down," which is when the raw data records that contribute to some aggregated value need to be inspected. Because stream-processing systems do not store data records longer than needed to compute system outputs, they cannot easily support drill-down. In contrast, embodiments of the invention can do so because raw data records are kept available on system storage.

A third advantage over stream-processing systems derives from the ability to correct or repair system outputs when original input data was found to be incorrect or incomplete, or when system processing was found to be faulty. In such cases, input data can be corrected, or system algorithms corrected, and the corresponding base cubes can be recomputed to reflect correct values. This "replay" ability allows the system to go back in time and repeat previous operations, which stream-based systems cannot do.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for distributed processing of streaming data records, the method comprising:
    parsing information in a received stream of data records to thereby identify a subset of the information relevant to a set of predetermined dimensions;
    receiving only the subset of the information in the received streaming data records at a plurality of distributed computational nodes based at least in part on workloads of the distributed computational nodes, properties of the streaming data records, or a random assignment, each node comprising a processor and a storage element;
    converting, at each node, a portion of the subset of the information in the received streaming data records into key-value pairs;
    parsing, at each node, the converted key-value pairs of the subset of the information in the received streaming data records received at each said node to (i) identify matches of the keys to at least one predetermined dimension and (ii) based thereon, combine the key-value pairs having identical keys;

re-distributing the keys of the converted subset of the received streaming data records among the distributed computational nodes in accordance with the predetermined dimensions stored on the nodes, wherein each distributed computational node receives the key corresponding to the predetermined dimension, thereby reducing a size of the portion of the subset of information in the received streaming data records received at each node;

updating a database storing measures of the dimensions by collecting data from the computational nodes in accordance with the parsed and re-distributed streaming data records; and using the database to respond to a query based on measures associated with one or more of the dimensions.

2. The method of claim 1, further comprising sending a pull request for the received streaming data records or receiving a push notification associated with the received streaming data records.

3. The method of claim 1, further comprising labeling the received streaming data record with a time period.

4. The method of claim 1, wherein re-distributing the keys of the received streaming data records comprises sending key-value pairs having the same key to one of the plurality of distributed computational nodes.

5. The method of claim 1, wherein the database comprises an OLAP cube or a plurality of redundant OLAP cubes.

6. The method of claim 5, wherein a cell in the OLAP cube comprises information derived from the received streaming data records.

7. The method of claim 1, further comprising receiving a request for information from the database.

8. A system for distributed processing of streaming data records, the system comprising:

a data collector for (i) receiving the streaming data records, (ii) parsing information in the received streaming data records to thereby identify a subset of the information relevant to a set of predetermined dimensions, and (iii) distributing only the subset of the information in the received streaming data records to a plurality of distributed computational nodes based at least in part on workloads of the distributed computational nodes, properties of the streaming data records, or a random assignment;

a data reorganizer for converting a portion of the subset of the information in the received streaming data records into key-value pairs, parsing the converted key-value pairs of the subset of the information in the received streaming data records received at each said node to (i) identify matches of the keys to at least one predetermined dimension and (ii) based thereon, combine the key-value pairs having identical keys, and re-distributing the keys of the converted subset of the received streaming data records among the distributed computational nodes based on the predetermined dimensions stored thereon, wherein each distributed computational node receives the key corresponding to the predetermined dimension, thereby reducing a size of the portion of the subset of information in the received streaming data records received at each node;

a cube constructor for constructing an OLAP cube based on the re-distributed streaming data records by collecting data from the distributed computational nodes; and an interactive cube manipulator for querying information within the OLAP cube and receiving a response in return.

9. The system of claim 8, wherein re-distributing the streaming data records comprises sending similar records to the same distributed computational nodes.

10. The system of claim 8, wherein the key in the key-value pairs comprises OLAP values used to identify the value in the key-value pair.

11. A system for distributed processing of streaming data records, the system comprising:

a plurality of computing nodes, each node comprising a processor and a local storage device, wherein each node receives only a subset of information relevant to a set of predetermined dimensions in an input stream of data records based at least in part on workloads of the computing nodes, properties of the input stream of the data records, or a random assignment, converts a portion of the subset of the information in the received streaming data records into key-value pairs, parses the converted key value pairs of the subset of the information in the received input stream of the data records received at each node to (i) identify matches of the keys to at least one predetermined dimension and (ii) based thereon, combine the key-value pairs having identical keys, and selectively redistributes some or all of the keys to another node in the plurality of computing nodes in accordance with the predetermined dimensions stored thereon, wherein each distributed computing node receives the key corresponding to the predetermined dimension, thereby reducing a size of the portion of the subset of information in the received input stream of the data records received at each node;

a network connecting the plurality of computing nodes, the network distributing and re-distributing the input stream of data records amongst the plurality of computing nodes; and a database for storing an OLAP cube having data collected from the computing nodes based on the parsed and re-distributed input stream of the data records.

12. The system of claim 11, further comprising a user interface for sending a query to, and receiving a response from, the database.

13. The system of claim 11, wherein the plurality of computing nodes comprises a Hadoop cluster.

* * * * *